United States Patent

Vivacqua et al.

[11] Patent Number: 5,831,342
[45] Date of Patent: Nov. 3, 1998

[54] SYSTEM FOR MODIFYING THE OUTPUT OF A COMPONENT OF A SAFETY RESTRAINT SYSTEM

[75] Inventors: Raymond J. Vivacqua, Northville; Christopher Eusebi, White Lake, both of Mich.

[73] Assignee: AlliedSignal Inc., Morristown, N.J.

[21] Appl. No.: 731,405

[22] Filed: Oct. 18, 1996

[51] Int. Cl.⁶ .................................................. B60R 21/32
[52] U.S. Cl. ........................ 307/10.1; 180/273; 280/735
[58] Field of Search .................... 307/9.1, 10.1, 307/121; 280/733–736, 742, 801.1, 802; 180/271, 282, 273, 268, 286; 340/436, 438, 669; 242/382.1, 382.2, 382.4

[56] References Cited

U.S. PATENT DOCUMENTS

| 4,103,842 | 8/1978 | Martin et al. | 242/384.2 |
| 5,074,583 | 12/1991 | Fujita et al. | 280/735 |
| 5,454,591 | 10/1995 | Mazur et al. | 280/735 |
| 5,618,056 | 4/1997 | Schoos et al. | 280/235 |
| 5,624,132 | 4/1997 | Blackburn et al. | 280/735 |
| 5,636,864 | 6/1997 | Hori | 280/735 |

*Primary Examiner*—Richard T. Elms
*Attorney, Agent, or Firm*—Markell Seitzman

[57] ABSTRACT

A seat belt retractor which is capable of functioning in either an ALR and ELR mode including a mode switching mechanism to convert the retractor between ELR to ALR modes of operation. A sensor capable of detecting which mode the retractor is in and accordingly provide a signal that modifies the operation of other devices of a safety restraint system.

5 Claims, 3 Drawing Sheets

SYSTEM FOR MODIFYING THE OUTPUT OF A COMPONENT OF A SAFETY RESTRAINT SYSTEM

BACKGROUND AND SUMMARY OF THE INVENTION

This invention generally relates to a motor vehicle safety restraint system. More particularly, the invention relates to a seat belt retractor which has a mode switching mechanism and a switch which will disable a passenger airbag or cause its inflation characteristics to be modified when the mechanism is engaged.

Seat belt retractors fall into two broad categories. The first being an emergency locking retractor (ELR) which is activated only during an emergency to prevent protraction of the seat belt (webbing) wound about a spool of the retractor. This type of retractor includes various known sensors such as a web sensor with initiates the locking of the spool when the webbing is pulled at a rate above a designated level and a vehicle or inertia sensor sensitive to levels of vehicle deceleration to bring the spool into a locked condition. The second type of retractor is one which is brought into a locked condition after a determinable length of webbing have been protracted. Once this length of webbing has been protracted the retractor spool is automatically in its locked condition preventing further protraction of the webbing, this type of retractor is often referred to as an automatic locking retractor (ALR). The ALR retractor is reset once the webbing is fully retracted upon the spool. The ALR function has also been incorporated into an ELR retractors. This type of retractor includes a mode switching mechanism to switch the retractor from operating as an ELR to one that operates as an ALR retractor.

This mode switching mechanism can take many forms such a feeler bar that rides upon the webbing coiled upon the spool. As the webbing is protracted the feeler bar rotates inwardly and at some angle, indicative of an amount of webbing protracted from the retractor the feeler bar causes a lock pawl to be moved into engagement with the lock teeth of the retractor. A more complex mode switching mechanism can be realized using a series of gears which rotates with the spool and at a predetermined position of one or more of these gears activates a lever to cause a lock pawl to engage a lock teeth of the retractor.

This ELR/ALR retractor operates as an ELR retractor during an emergency and acts as an ALR once the seat belt webbing has been protracted a determinable length. A retractor with an ALR feature has proven useful in securing a child seat to the vehicle seat. After the child seat is in place upon the vehicle seat, the webbing is fully protractor from the retractor activating the mode switching mechanism. After the latch plate (also referred to as a tongue) is secured into its buckle the webbing is released and rewound into the retractor by its rewind spring. Once this occurs the webbing is pulled tight about the child seat and since the retractor is now in its ALR mode of operation the webbing is prevented from protracting during an emergency and as such the child seat is held securely upon the seat.

A primary object of the present invention is to provide an ALR/ELR seat belt retractor which has a mode switching mechanism, the mode switching of which can be used as a means to control the manner in which an air bag is deployed in the presence of a child seat. A further object of the invention is to provide a retractor that has a switch or sensing means which will detect the change of operational mode from the ELR mode to ALR mode, indicative of the fact that the webbing has been secured about a child seat and provide a signal which will be used to vary the output of an inflator in an airbag module.

Another object of the invention is to provide a method of disabling or modifying the performance of an air bag module after the child seat has been properly installed.

Other objects, features, and advantages will become apparent from the following description and appended claims.

Accordingly the invention comprises: a seat belt retractor having a mode switching mechanism capable of transforming the retractor to operate as an ALR or ELR retractor. A sensing means capable of detecting the mode of operation of the retractor and to provide a signal which can be used to modify the output of another component of the safety restraint system typically an inflator of an air bag module or a seat belt pretensioner. Additionally, a warning lamp may be provided to show the airbag has been disabled and the mode switching mechanism is properly engaged.

Many other objects and purposes of the invention will be clear from the following detailed description of the drawings.

DETAILED DESCRIPTION OF THE DRAWINGS

Figure 1:
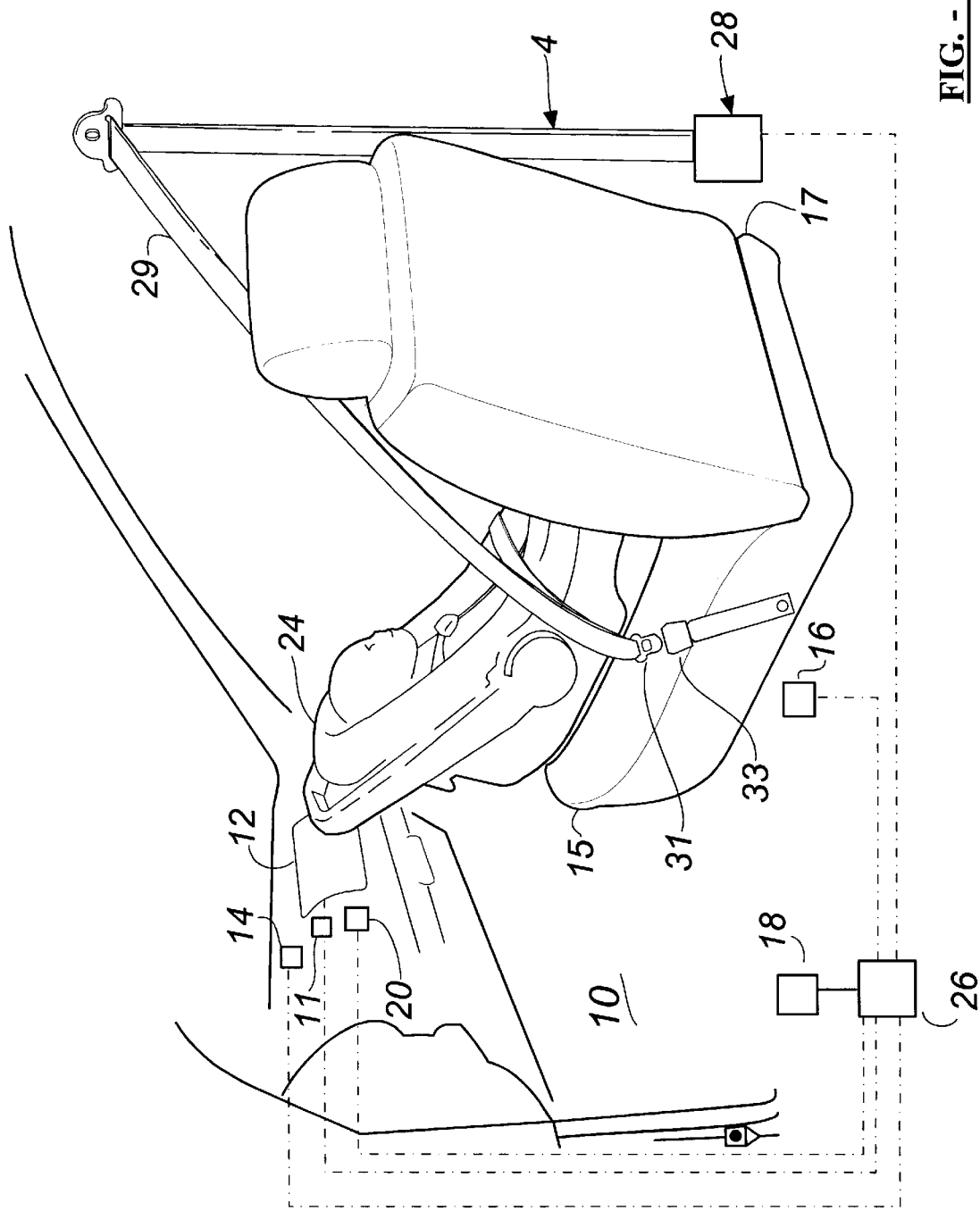
FIG. 1 is an illustration of a restraint system incorporating the present invention.

Reference is made to FIG. 1 which shows a conventional vehicle safety restraints system 10 including at least one air bag 12 mounted near or within the instrument panel, an occupant position sensors 14 such an infrared sensor or radar sensor mounted in a forward location in the passenger compartment such as on the instrument panel or on the A-pillar, an occupant weight sensor 16 typically mounted with the seat cushion 15 of the seat 17 to sense the weight of the occupant or object on the cushion, a crash severity sensor or sensor 18 typically mounted on the chassis of the vehicle to generate a crash signal indicative of a severe accident, warning lamp 20 which will provide a visual signal, and a seat belt system (4) which includes am ELR/ALR retractor 28, seat belt webbing 29, a tongue 31 and buckle 33. A child seat 24 is shown upon the seat 17 with the webbing 29 securing it in place. The air bag 12 is inflated by an inflator 11 capable of inflating the air bag 12 at one or more inflation rates (multi-level) in response to one or more control signals generated by a control unit 26.

Figure 2:
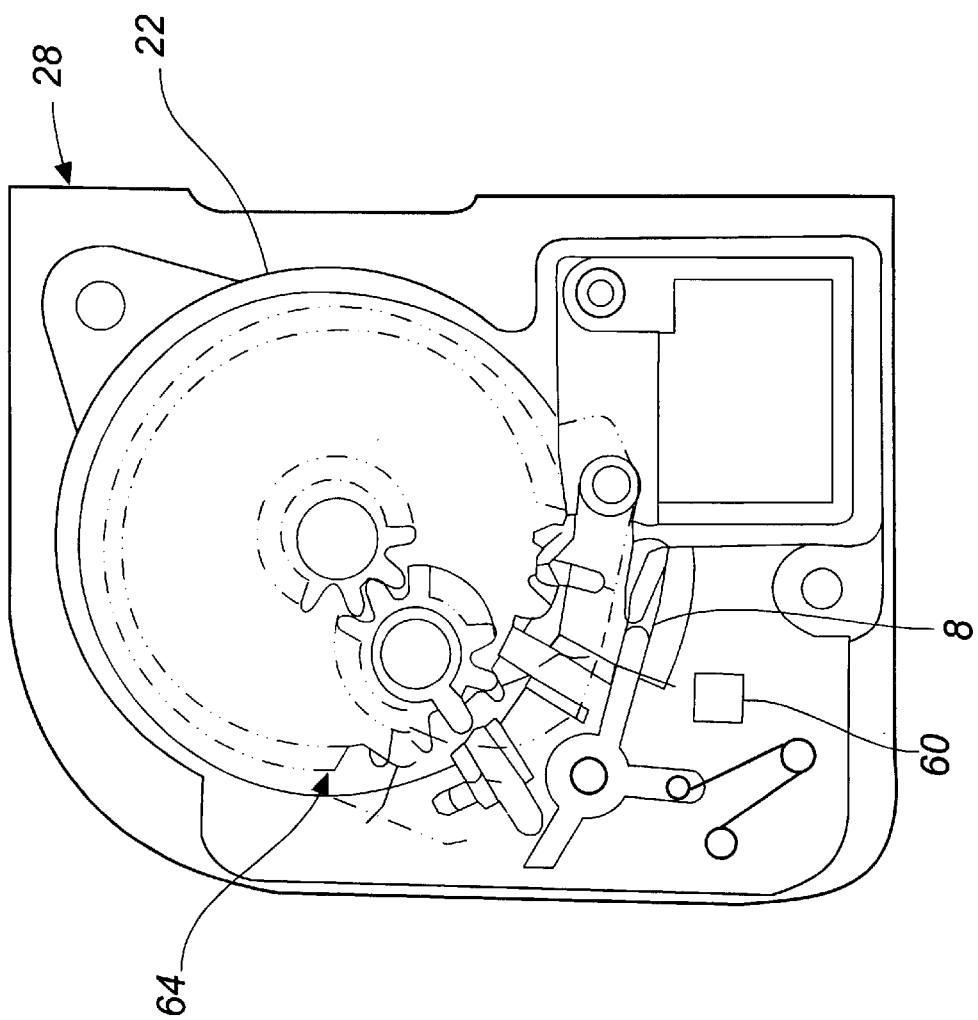
FIG. 2 shows a mode switching mechanism (22) of a seat belt retractor incorporating the present invention.

FIG. 2 is illustrative of an ELR/ALR retractor 28 with a mode changing mechanism 22 shown in U.S. Pat. No. 4,811,912 which is incorporated herein by reference. This retractor 28 includes a gear mechanism 64 which rotates as the webbing is extracted from the retractor. At a predetermined position, a lever-ratchet 8 of the mechanism 22 is caused to change position thus initiating a change in the mode of operation of the retractor. FIG. 2 also shows a sensing means 60 positioned proximate to the level 8 to detect this change in position of the lever 8 (which is indicative of the change in operating mode from its ELR mode to its ALR mode).

Figure 3:
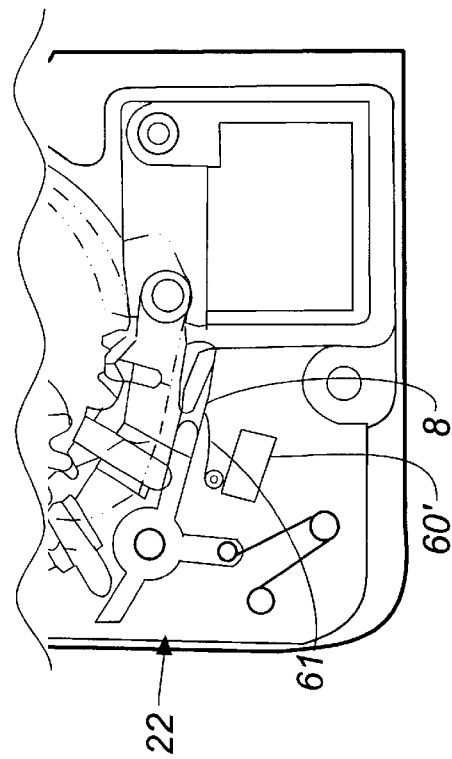
FIG. 3 shows a more detailed view of a sensor means.

FIG. 3 shows an alternate embodiment of a sensor means using a standard lever arm switch 60' to signal the change in motion of the lever 8 and hence a change in operating mode of the retractor. The switch 60' includes a lever 61 which contacts the lever-ratchet 8. As the lever moves relative to the switch 60' the switch generates a control signal (mode indication signal) communicated to the control unit 26.

Figure 4:
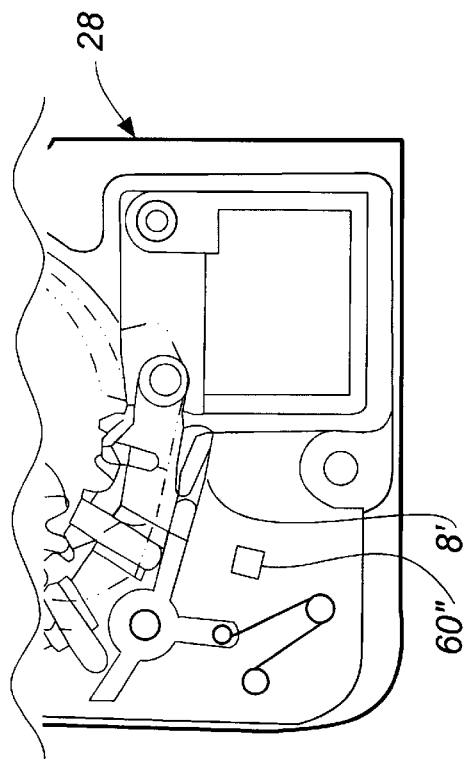
FIG. 4 shows a further embodiment of the invention.

FIG. 4 shows a further embodiment of the invention in which the sensing means is realized by a hall effect sensor 60". In this embodiment, all or a portion of the lever arm 8 is made of a magnetic material. The movement of the lever is detected by the hall effect sensor 60" to generate the mode change signal.

The following describes the operation of the invention. The child seat 24 is first placed on the vehicle seat 17. The webbing 29 is extracted from the retractor 28 and the tongue 31 is inserted within the buckle 33. As the webbing is protracted the retractor spool rotates moving the gears of the mode switching mechanism. With the webbing extended the lever 8 is caused to move placing the retractor 26 in its ALR mode of operation. Thereafter the webbing is released and is rewound upon the retractor spool drawing the webbing 29 tightly about the child seat 24. The movement of the lever 8 is sensed by the switch mean 60 and communicated to and used by the control unit 28. The control unit also receives control signal from various crash sensors as well as a signal generated at the buckle 33 indicating that the tongue has been latched into the buckle.

During a crash the control unit 26 will generate one or more activation signals to activate the inflator 11 to inflate the air bag 12 at one or more inflation rates dependent upon the severity of the accident and the type of inflator used. The control unit 28, upon receipt of the mode switching signal (indicative of the presence of a child seat 24), uses this signal to either inhibit or cause the inflator 11 to inflate the air bag 12 at a lower rate that is compatible with an installed child seat.

Many changes and modifications in the above described embodiment of the invention can, of course, be carried out without departing from the scope thereof. Accordingly, that scope is intended to be limited only by the scope of the appended claims.

We claim:

1. A safety restraint system usable in conjunction with a child seat (24) comprising:

a retractor (28) including a mode switching means (22) capable of changing the mode of operation of the retractor between an automatic locking (ALR) mode and an emergency locking (ELR) mode in response to the amount of seat belt webbing extracted from the retractor;

sensing means (60, 60', 60"), operatively connected to the mode switching means for providing a mode indication signal indicative of the change in mode between ALR and ELR modes of operation;

control unit means responsive to the mode indication signal for modifying the operation of another safety device when the presence of a child seat has been detected wherein the other safety device includes an air bag (12) filled by an inflator (11) in response to at least one activation signal and wherein the control unit means (26) is responsive to designated control signals indicative of the severity of the crash and the mode indication signal to inhibit the operation of the inflator during the presence of the mode indication signal;

wherein the inflator (11) is a multi-level inflator capable of inflating the air bag at least two different rates of inflation in response to the first and second control signals indicative of the severity of a crash and wherein the control unit means (26) includes signal means responsive to the mode indication signal for inhibiting the complete operation of the inflator (11) or activating the inflator at a low inflation rate level when a child seat (24) in present.

2. The system as defined in claim 1 wherein said sensing means is a lever activated switch.

3. The system as defined in claim 2 wherein the sensing means is a hall effect sensor.

4. The system as defined in claim 1 further comprising a warning lamp means for indicating that the system is properly working.

5. A safety restraint system usable in conjunction with a child seat (24) comprising:

a retractor (28) including a mode switching means (22) capable of changing the mode of operation of the retractor between an automatic locking retractor (ALR) mode and an emergency locking retractor (ELR) mode in response to the amount of seat belt webbing extracted from the retractor;

sensing means (60, 60', 60"), operatively connected to the mode switching means for providing a mode indication signal indicative of the change in mode between ALR and ELR modes of operation and control unit means responsive to the mode indication signal for modifying the operation of another safety device when the presence of a child seat has been detected;

wherein said sensing means is a magnetically responsive sensor.

* * * * *